(12) United States Patent
Zampato et al.

(10) Patent No.: US 12,203,438 B2
(45) Date of Patent: Jan. 21, 2025

(54) TURBINE CURRENT GENERATOR

(71) Applicant: ENI S.P.A., Rome (IT)

(72) Inventors: Massimo Zampato, Venice (IT); Stefano Carminati, San Donato Milanese (IT); Stefano Mauro, Turin (IT); Tharek Manuel Mohtar Eizaga, Milan (IT); Paolo Guglielmi, Moncucco Torinese (IT)

(73) Assignee: ENI S.P.A., Rome (IT)

( * ) Notice: Subject to any disclaimer, the term of this patent is extended or adjusted under 35 U.S.C. 154(b) by 102 days.

(21) Appl. No.: 17/999,633

(22) PCT Filed: Jun. 3, 2021

(86) PCT No.: PCT/IB2021/054867
§ 371 (c)(1),
(2) Date: Nov. 22, 2022

(87) PCT Pub. No.: WO2021/245592
PCT Pub. Date: Dec. 9, 2021

(65) Prior Publication Data
US 2023/0203919 A1    Jun. 29, 2023

(30) Foreign Application Priority Data
Jun. 4, 2020  (IT) .................. 102020000013207

(51) Int. Cl.
*F03B 13/00* (2006.01)
*F03B 13/10* (2006.01)
*H02K 7/18* (2006.01)

(52) U.S. Cl.
CPC .......... *F03B 13/10* (2013.01); *F05B 2220/20* (2013.01); *H02K 7/1823* (2013.01)

(58) Field of Classification Search
CPC ....... H02K 7/1823; F03B 13/02; F03B 13/10; F05B 2220/20; F05B 2220/602; F05B 2220/7066; E21B 41/0085; Y02B 10/50
See application file for complete search history.

(56) References Cited

U.S. PATENT DOCUMENTS 9,112,389 B2 *  8/2015  Singh ..................... G01F 1/115
9,583,993 B1   2/2017  Kaiser et al.
(Continued)

FOREIGN PATENT DOCUMENTS

CN    201874727 U    6/2011
CN    201902238 U    7/2011
(Continued)

OTHER PUBLICATIONS

International Search Report issued Aug. 18, 2021 re: Application No. PCT/IB2021/054867, pp. 1-3, citing: WO 2019/145989 A1, US 2015/0145257 A1, U.S. Pat. No. 9,583,993 B1 and DE 10 2010 009215 A1.

(Continued)

*Primary Examiner* — Julio C. Gonzalez
(74) *Attorney, Agent, or Firm* — CANTOR COLBURN LLP

(57) ABSTRACT

A turbine current generator includes a hollow bearing cylinder to be engaged inside a pipe or a duct for the transit of a fluid, in particular a fluid transit duct deriving from the drilling or exploration of an oil field; a hollow rotating cylinder rotatably and coaxially engaged inside the bearing cylinder and defining a respective transit cylindrical chamber for a fluid. The bearing and rotating cylinders defining at least a cylindrical gap; one or more magnetic or electromagnetic components operatively engaged to the bearing cylinder and/or to the rotating cylinder to generate at least one electric current during the rotation of the rotating cylinder inside the bearing cylinder; an impeller or impellers (Continued)

arranged in the chamber of the rotating cylinder according to positions aligned along a longitudinal axis of the latter, the impellers engaged inside the rotating cylinder to rotate integrally with the latter upon the action of a fluid.

21 Claims, 4 Drawing Sheets

(56) References Cited

U.S. PATENT DOCUMENTS

| | | | |
|---|---|---|---|
| 11,174,833 B2* | 11/2021 | Alzu'Bi | F03B 3/126 |
| 2014/0117669 A1 | 5/2014 | Kyle et al. | |
| 2015/0145257 A1 | 5/2015 | Hendricks | |
| 2021/0123476 A1* | 4/2021 | De Raeve | F16C 27/02 |

FOREIGN PATENT DOCUMENTS

| | | |
|---|---|---|
| CN | 107575334 A | 1/2018 |
| DE | 102010009215 A1 | 8/2011 |
| GB | 2507044 A | 4/2014 |
| UA | 115401 C2 * | 10/2017 |
| WO | 2019145989 A1 | 8/2019 |

OTHER PUBLICATIONS

Written Opinion issued Aug. 18, 2021 re: Application No. PCT/IB2021/054867, pp. 1-5, citing: WO 2019/145989 A1, US 2015/0145257 A1, U.S. Pat. No. 9,583,993 B1 and DE 10 2010 009215 A1.

* cited by examiner

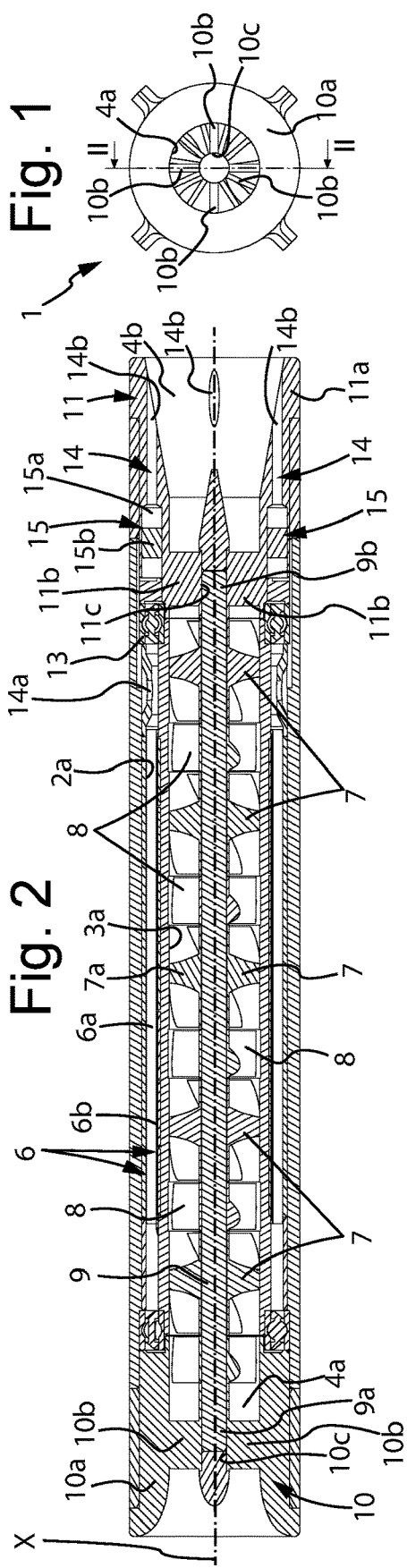

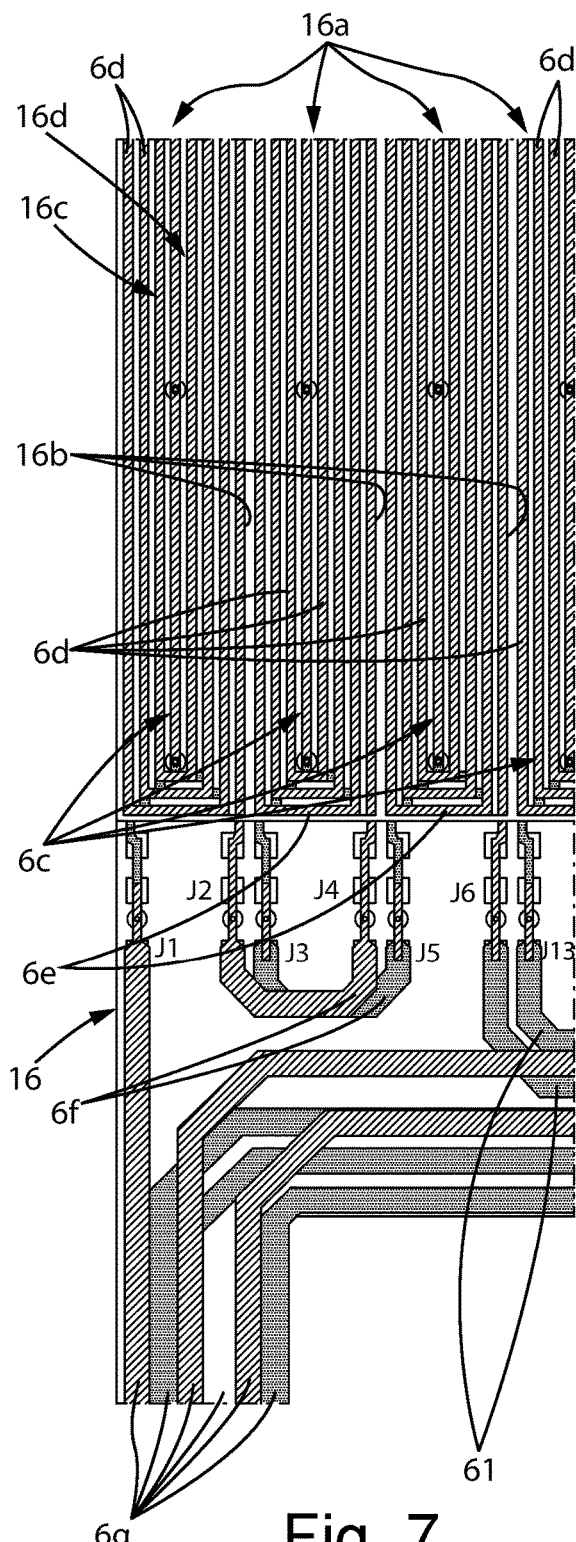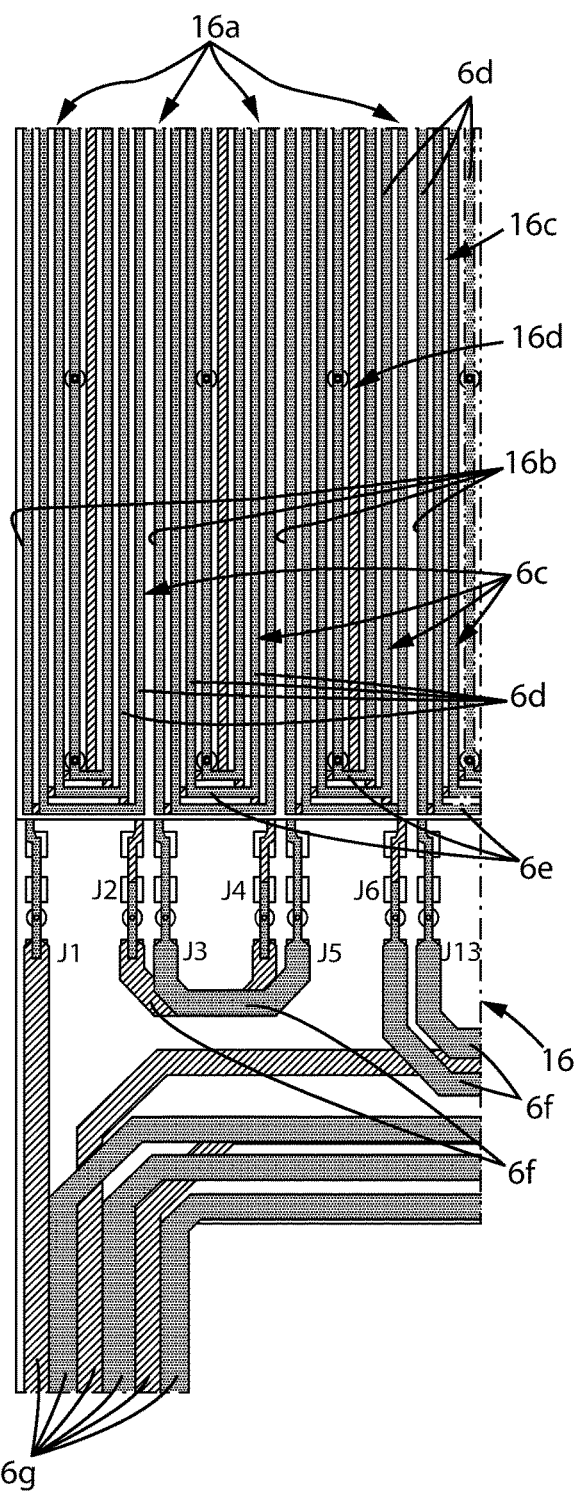

TURBINE CURRENT GENERATOR

TECHNICAL FIELD

The present disclosure relates to a turbine current generator.

The present disclosure is used in the sector of extracting energy from moving fluids in order to supply measurement systems, sensors and/or similar electrical/electronic devices directly or through storage systems.

The present disclosure therefore lends itself to being used both in the oil sector with particular reference to the exploitation and exploration of oil fields and in any other sector in which the movement of fluids is envisaged, such as for example in aqueducts, in systems of distribution of fluids which may also be under pressure.

BACKGROUND

As is known, there are various processes and devices intended for the recovery of electrical energy from sources commonly available in the environment. An example of such devices can be found in turbines and/or impellers intended for the conversion of the kinetic energy possessed by a moving fluid into electrical energy.

From document CN201902238U a current generator is known which provides for an impeller immersed in a fluid flowing inside a pipe.

With reference to document CN107575334, current generators are described which are housed externally to the pipes where the fluid flows from which the energy to be converted into electrical energy is drawn. Each current generator is provided with one or more impellers that lie inside the reference pipe being immersed in the flowing fluid. Each impeller is connected to the respective current generator by means of a shaft that crosses the pipe itself from inside out.

Document US2014117669 also describes and illustrates different solutions of current generators whose body and some components are housed outside the reference pipes, while the relative impellers are arranged inside the pipes in such a way as to be driven in motion by the fluid flowing in them. Also in this case, the shaft of each impeller crosses the relative pipe from inside out. Also from document CN201874727U an impeller of a current generator is known which is arranged inside a pipe crossed by a fluid and provided with a shaft that crosses the pipe from inside out.

With reference to document GB201218534, a current generator is known which provides one or more impellers arranged in series inside a pipe where a fluid flows. The components used to convert kinetic/mechanical energy into electrical energy are also arranged inside or integrated into the pipe. In fact, essential components of the current generator are mounted on the rotor of the impellers, while other components are instead arranged on respective stators that enclose the impellers inside the respective pipe.

SUMMARY

Although the known current generators propose different solutions for converting the kinetic/mechanical energy possessed by a fluid moving inside a pipe into electrical energy, the Applicant has found that they are not, however, free from some drawbacks and can be improved under various aspects, mainly in relation to the use of current generators under conditions of extraction of fluids at high pressure (about 700 bar) and temperature (about 200° C.) that flow inside ducts and pipes with reduced section (not exceeding 20 mm), to the overall sealing of the ducts and pipes in the points where the current generators are installed, to the overall dimensions of the ducts and pipes at the points where the current generators are installed, to the overall dimensions of the current generator.

In particular, the Applicant has found that known current generators are badly suited to work in environments characterized by high pressures and temperatures, such as those under which one must normally operate during the exploitation and exploration of oil fields.

In fact, all known solutions whose current generators are positioned outside the pipes with their respective impellers arranged inside the latter are subject to significant sealing problems at the crossing of the transmission shafts of the walls of the pipes, which are notably sharpened under conditions of high pressures.

Moreover, since these current generators need suitable transmission mechanisms between the impellers and the essential parts of the same which reside outside the pipes, they are particularly cumbersome, consequently also increasing the overall dimensions of the pipes.

The present disclosure provides a current generator capable of solving the problems encountered in the prior art.

the present disclosure further provides a current generator which lends itself to work effectively even under conditions of high pressure, for example at about 700 bar, and at temperatures, for example at about 200° C.

The present disclosure also provides a compact current generator that can be housed inside pipes, even with small dimensions, such as for example pipes whose section does not exceed 20 mm.

The present disclosure provides a current generator capable of ensuring the overall dimensions of the pipes on which it is installed.

These specified and yet further purposes are substantially achieved by a turbine current generator, as expressed and described in the following claims.

By way of example, the description of a preferred but not exclusive embodiment of a turbine current generator, in accordance with the present disclosure, is now reported.

BRIEF DESCRIPTION OF THE DRAWINGS

Such description will be made hereinbelow with reference to the accompanying drawings, provided for indicative purposes only and therefore not limiting, wherein:

FIG. 1 is a front view of a turbine current generator, in accordance with the present disclosure;

FIG. 2 is a section of the turbine current generator taken along the plane II-II of FIG. 1;

FIG. 3 is a further front view of the turbine current generator of FIGS. 1 and 2;

FIG. 4 is a section of the turbine current generator taken along the plane IV-IV of FIG. 3;

FIGS. 7 to 11 are schematic views of portions of the flexible laminar structure in which it is possible to view a series of conductive tracks of the windings of the generator of FIGS. 1 to 4.

DETAILED DESCRIPTION OF THE DRAWINGS

Figures 5, 6:
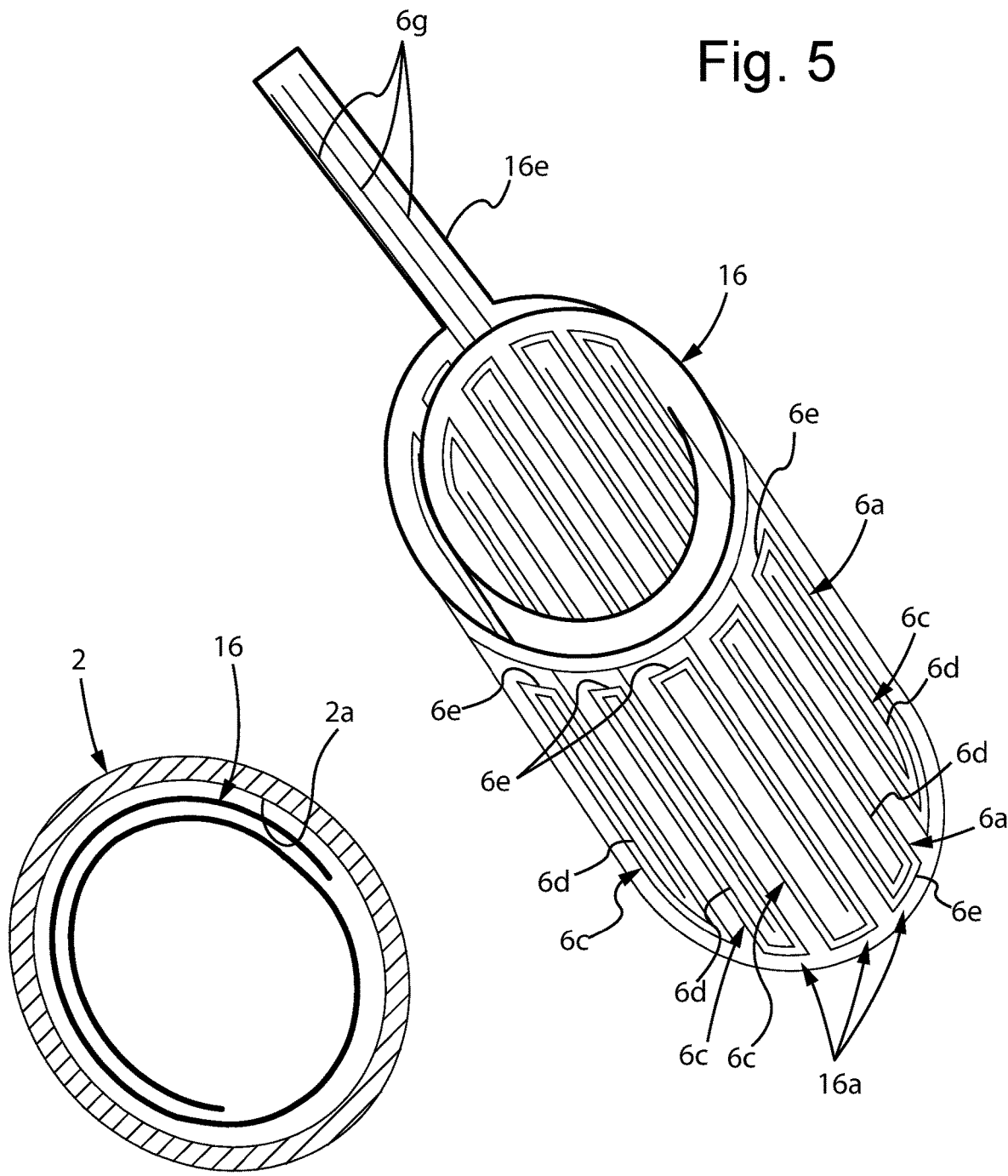
FIG. 5 is a schematic perspective view of a flexible laminar structure for supporting a plurality of windings present in the generator of FIGS. 1 to 4.
FIG. 6 is a schematic cross section of the flexible laminar structure of FIG. 5 represented in relation to a hollow bearing cylinder of the generator of FIGS. 1 to 4, to form the stator of the latter one.

With reference to the attached figures, the number 1 indicates overall a turbine current generator, according to the present disclosure.

The turbine current generator is of the type comprising a stator and a rotor.

In detail, the current generator 1 comprises a hollow bearing cylinder 2 which can be engaged inside a pipe or a duct for the transit (not shown as it is known) of a fluid, in particular a pressurised fluid transit duct deriving from the drilling and/or the exploration of an oil field.

The current generator 1 also comprises a hollow rotating cylinder 3 which is rotatably and coaxially engaged inside the hollow bearing cylinder 2 and defines a respective transit cylindrical chamber 4 for a fluid.

As is visible in FIGS. 2 and 4, the hollow bearing cylinder 2 and the hollow rotating cylinder 3 define, at least partially, at least a cylindrical gap 5 which develops between the hollow bearing cylinders 2 and the hollow rotating cylinders 3.

The electric generator 1 further comprises magnetic or electromagnetic components 6 operatively engaged to the hollow bearing cylinder 2 and/or to the hollow rotating cylinder 3 to generate at least an electric current during the rotation of the hollow rotating cylinder 3 inside the hollow bearing cylinder 2.

Still with reference to FIGS. 2 and 4, the current generator 1 is provided with at least one impeller 7 arranged in the transit cylindrical chamber 4 of the hollow rotating cylinder 3 according to a position aligned with a longitudinal axis X of the latter.

In accordance with the embodiments shown in FIGS. 2 and 4, the current generator 1 is provided with a plurality of impellers 7 arranged in the transit cylindrical chamber 4 of the hollow rotating cylinder 3 according to positions aligned with the longitudinal axis X of the latter.

Advantageously, the impellers 7 are engaged inside the hollow rotating cylinder 3 so as to rotate integrally with the latter upon the action of a fluid which runs through the transit cylindrical chamber 4 of the hollow rotating cylinder 3 and acts on each impeller 7.

In detail, each impeller 7 is fixed to an internal surface 3a of the hollow rotating cylinder 3 by means of respective peripheral portions 7a so as to rotate the hollow cylinder 3 when the impellers are induced in rotation by the transit of a fluid in the transit cylindrical chamber 4.

Still with reference to FIGS. 2 and 4, the turbine current generator 1 comprises at least one flow rectifier 8 arranged in the transit cylindrical chamber 4 of the hollow rotating cylinder 3, preferably a plurality of flow rectifiers 8 arranged in the transit cylindrical chamber 4 of the hollow rotating cylinder 3.

The impellers 7 and the rectifiers 8 are interleaved so to alternate along the longitudinal development of the hollow rotating cylinder 3.

The turbine current generator 1 further comprises a static support shaft 9 developing axially inside the transit cylindrical chamber 4 of the hollow rotating cylinder 3.

The impellers 7 are rotatably engaged on the static support shaft 9 so to rotate, integrally with the hollow rotating cylinder 3, around the longitudinal axis X of the latter.

Each flow rectifier 8 is instead fixed on the static support shaft 9 so that it remains stationary, together with the latter, with respect to the impellers 7 and to the hollow rotating cylinder 3.

As is visible in FIGS. 2 and 4, the static support shaft 9 is engaged, at its ends 9a, 9b, to a first and a second support shank 10, 11 which respectively define the inlet 4a and the outlet 4b of the transit cylindrical chamber 4 of the hollow rotating cylinder 3.

In particular, each support shank 10, 11 comprises a substantially cylindrical body 10a, 11a inside which a plurality of supports 10b, 11b develop radially and converge in a central circular seat 10c, 11c in which the relative end 9a, 9b of the static support shaft 9 is inserted.

The supports 10b, 11b of the first and second support shank 10, 11 are interleaved with corresponding transit openings 10d, 11d (FIG. 4) through which the advancing fluid is free to enter the transit cylindrical chamber 4 and to exit from the same.

As is visible in FIGS. 2 and 4, the turbine current generator 1 comprises a first bearing 12 operatively interposed between the first support shank 11, the hollow bearing cylinder 2 and the hollow rotating cylinder 3 and a second bearing 13 operatively interposed between the second support shank 11, the hollow bearing cylinder 2 and the hollow rotating cylinder 3. The bearings 12, 13 are of such a type as to ensure the insulation of the cylindrical gap 5 with respect to the transit cylindrical chamber 4 of the hollow rotating cylinder 3, partly defining this cylindrical gap 5.

With particular reference to the aforementioned magnetic or electromagnetic components 6, a first magnetic or electromagnetic component 6a, preferably a plurality of first magnetic or electromagnetic components 6a, are engaged, in particular fixed, for example by gluing, to an internal surface 2a of the hollow bearing cylinder 2 inside the cylindrical gap 5.

Figure 9:
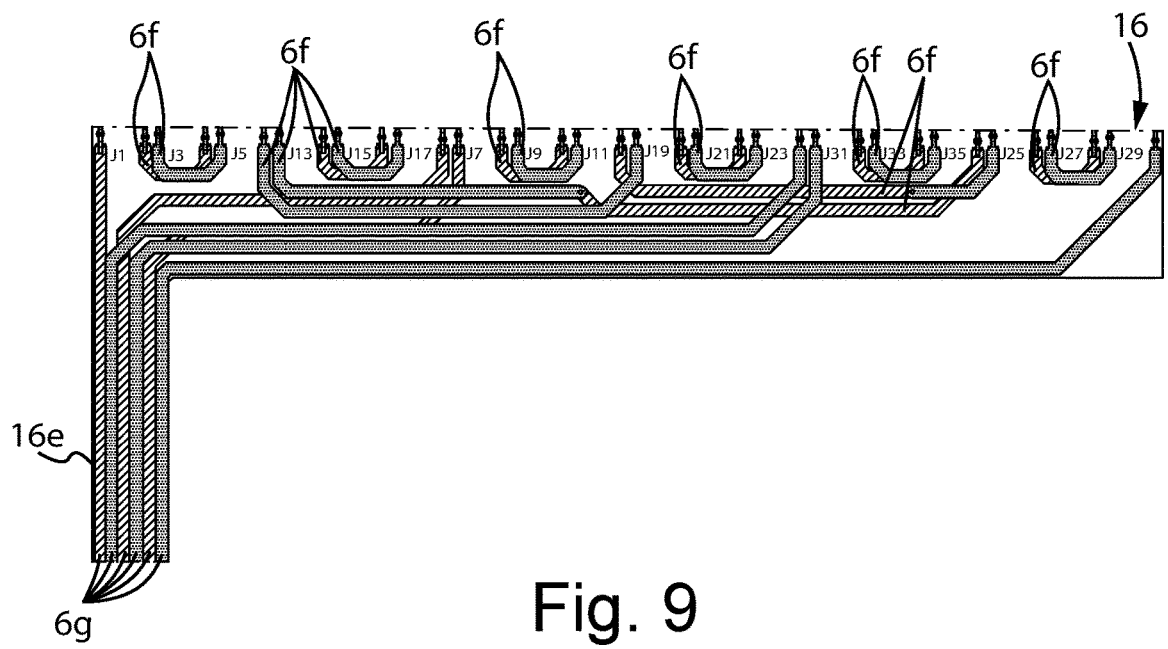
Figure 10:
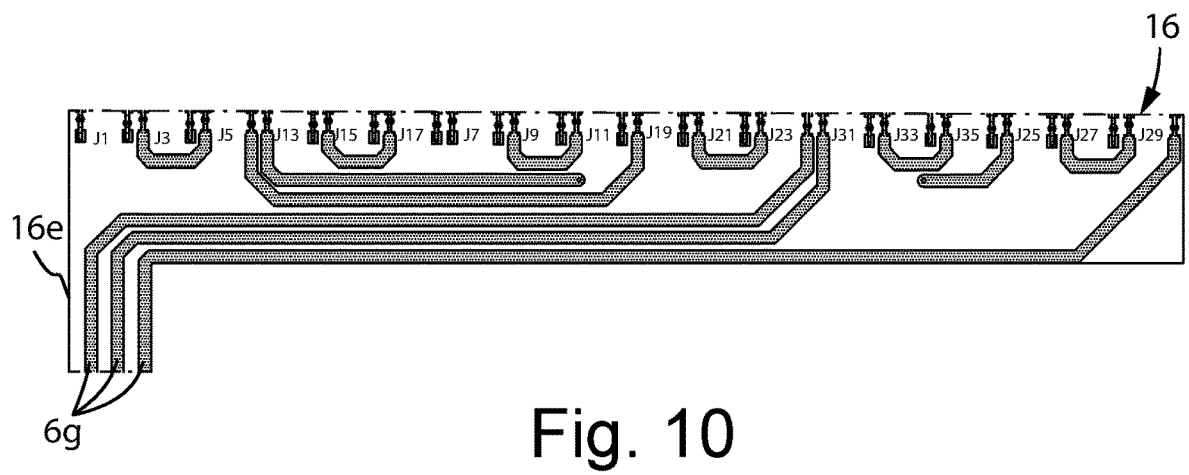
Figure 11:
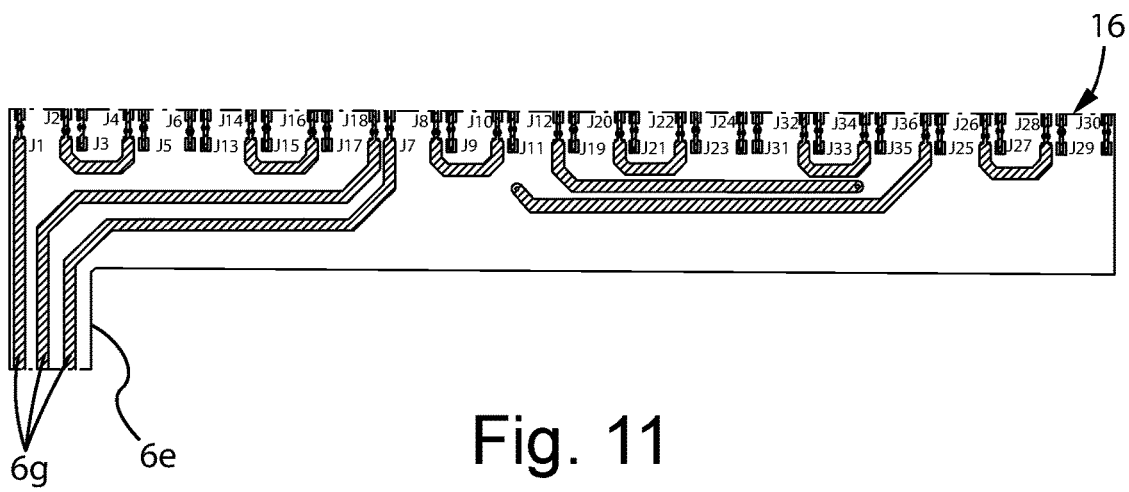

In accordance with a preferred embodiment of the present disclosure shown in FIGS. 5 to 11, the first magnetic or ferromagnetic components 6a comprise a plurality of windings 6c (FIGS. 5, 7 and 8) each having a substantially flat structure.

In detail, each winding 6c comprises a series of conductive tracks 6d which define a laminar and flexible printed circuit.

Advantageously, the conductive tracks 6d of each winding 6c develop mainly parallel to each other, having substantially orthogonal connecting sections 6e.

Furthermore, the conductive tracks 6d of each winding 6c develop in a concentrated manner on at least two superimposed planes or layers.

Preferably, the conductive tracks 6d of each winding 6c are incorporated in, or supported by, a flexible laminar structure 16 which can also assume a cylindrical or semi-cylindrical configuration.

Advantageously, the flexible laminar structure 16 which supports the conductive tracks 6d of the windings 6c can assume a rolled or wound configuration (FIGS. 5 and 6) having superimposed structural portions. In this way, the flexible laminar structure has high degrees of mechanical strength to pressure and considerably simplifies the assembly steps of the electric generator 1.

In order to insulate the windings 6c especially at the superimposed portions of the structure, it is appropriate to apply at least one insulating lacquer on the conductive tracks 6d of the windings 6c and, consequently, on both faces of the flexible laminar structure 16.

According to a preferred configuration of the present disclosure, the conductive tracks 6d of each winding 6c are grouped on respective structural sectors 16a of the flexible laminar structure 16 which each have a substantially rectangular shape.

As visible in FIGS. 7 and 8, the structural sectors 16a of the flexible laminar structure 16 are arranged side by side along a respective long side 16b.

In accordance with this embodiment, each winding 6c develops from one of the sides, preferably a long side 16b, of the respective structural sector 16a of the flexible laminar structure 16, extending substantially parallel to the respective perimeter of this structural sector 16a, from the periphery 16c towards a central area 16d of the same.

At the central area 16d of the respective structural sector 16a of the flexible laminar structure 16, the respective winding 6c develops from a plane or layer to the other one in which it develops substantially parallel to the perimeter of the respective structural sector 16a from the central area 16d to the periphery 16c of the same.

As is visible in FIGS. 7 and 8, the windings 6c of each structural sector 16a of the flexible laminar structure 16 are electrically connected in series or in parallel with each other by means of corresponding connection bridges 6f.

With reference to FIGS. 5 and 7-11, the flexible laminar structure 16 comprises at least one electrical connection appendix 16e, substantially flat, along which one or more electrical connection tracks 6g for connecting the windings 6c to at least another component of the electric generator 1 develop.

In accordance with a preferred solution of the present disclosure, the flexible laminar structure 16 comprises at least one film made of an insulating material, such as for example polyimide capable of remaining stable in a range of temperatures between −269° C. and 400° C. The flexible laminar structure 16 also has two upper and lower copper layers.

In accordance with a preferred solution of the present disclosure, the polyimide layer has a thickness of not less than 17 μm, while the two copper layers each have a thickness of not less than 25 μm.

The thinnest flexible laminar structure 16 has a thickness of not less than 0.067 mm.

Advantageously, the flexible laminar structure 16 is positioned according to a rolled or wound configuration (FIGS. 5 and 6) in the cylindrical gap 5 and fixed to the internal surface 2a of the hollow bearing cylinder 2, preferably by gluing.

Alternatively, it is possible to provide two or more flexible laminar structures 16 having different circumferences which are fixed, the widest one, against the internal surface 2a of the hollow bearing cylinder 2, the least wide, against the widest one.

Advantageously, the hollow bearing cylinder 2 which, together with the flexible laminar structure 16 constitutes the stator of the generator 1, is made of a ferromagnetic material, suitable for being machined or sintered into simple shapes with low saturation levels compared to those of the main magnetic steels, such as some iron- and nickel-based magnetic metal alloys or metal alloys with high magnetic permeability.

Alternatively, the hollow bearing cylinder 2 could also be made of a plastic material to limit the losses in the iron in the event that the productivity of the turbine is particularly low.

A second magnetic or electromagnetic component 6b is engaged with the hollow rotating cylinder 3 to face towards the cylindrical gap 5 at the first magnetic or electromagnetic component 6a.

In accordance with a preferred solution of the disclosure, the second magnetic or ferromagnetic component 6b comprises a plurality of permanent magnets which are fixed, preferably by gluing, on an external surface 3b of the hollow rotating cylinder 3.

Each permanent magnet has a substantially parallelepiped shape, preferably with a rectangular base and is housed in a respective seat obtained on the external surface 3b of the hollow rotating cylinder 3.

Each permanent magnet is advantageously sectioned along its longitudinal or axial development into a plurality of pieces in order to reduce losses due to eddy currents. It is preferable that the permanent magnets are made of a material with a low thermal coefficient, such as for example Samarium-Cobalt.

In order for the position of the permanent magnets on the hollow rotating cylinder 3 to be ensured even during high rotation speeds of the latter, it is possible to provide bandaging or containment structures (not shown in the accompanying figures) that have a cylindrical external surface.

Alternatively, in order to give the permanent magnets an overall cylindrical surface without structural discontinuities, it is possible to apply a resin or similar material capable of giving the hollow rotating cylinder 3 and permanent magnets assembly a continuous cylindrical external surface, thus reducing to the minimum the resistance to rotation of the rotor by any fluid present in the gap 5.

The hollow rotating cylinder 3 acts as a flow guide for the magnetic flow supported by the permanent magnets. Advantageously, the hollow rotating cylinder 2 is made of a ferromagnetic material capable of withstanding mechanical loads and the attacks of chemical agents.

Preferably, the hollow rotating cylinder 2 is made of a ferromagnetic material having a relative permeability greater than 100, so as to offer an adequate flow path to the permanent magnets it houses and to achieve a low magnetomotive force drop.

In detail, the hollow rotating cylinder 2 is made of a stainless steel or, for example, of a nickel alloy which materials allow an adequate compromise between thickness and level of magnetic saturation and suitable mechanical characteristics.

As regards the arrangement of the first and second magnetic components 6a, 6b, it should be considered that for the purposes of the present disclosure it is not excluded in any way to provide that the permanent magnets are applied to the internal surface 2a of the hollow bearing cylinder 2 and the windings are arranged on the hollow rotating cylinder 3 or to provide that the respective windings are applied both on the hollow bearing cylinder 2 and on the hollow rotating cylinder 3.

According to an advantageous aspect of the present disclosure, the cylindrical gap 5 is hermetically insulated with respect to the transit cylindrical chamber 4 of the hollow rotating cylinder 3 and is occupied, at least partially, by a dielectric fluid, preferably a dielectric oil.

As visible in FIGS. 2 and 4, the cylindrical gap 5 comprises at least one connection channel 14 which has a first connection port 14a confluent in the cylindrical gap 5 and a second connection port 14b confluent in the transit chamber 4 at the outlet 4b and at the second support shank 11.

In detail, the cylindrical gap 5 is provided with a plurality of connection channels 14 each having a first communication port 14a and a second communication port 14b.

A pressure compensation device 15 is operatively arranged inside each connection channel 14.

In particular, each compensation device 15 comprises at least one compensation chamber 15a in fluid communication with the respective connection channel 14 between the first connection port 14*a* and the second connection port 14*b*, operatively occupied by at least one compensation piston 15*b*.

Each compensation device 15 is designed to reduce the overall volume of the cylindrical gap 5 as the pressure in the transit cylindrical chamber 4 of the hollow rotating cylinder 3 increases.

In this way, each compensation device 15 keeps the pressure difference between the cylindrical gap 5 and the transit cylindrical chamber 4 of the hollow rotating cylinder 3 constant, preferably between -1 bar and +1 bar, even more preferably substantially equal to 0 bar.

The current generator according to the present disclosure solves the problems observed in the known technique and achieves important advantages.

First of all, the current generator described above lends itself to work effectively even under conditions of high pressure, for example at about 700 bar, and of temperature, for example at about 200° C.

Furthermore, the structural configuration of the turbine current generator described above gives the generator itself significantly reduced overall dimensions resulting extremely compact.

Finally, it should be considered that the structural configuration of the generator described above allows the application thereof inside the pipes and/or ducts for which it is intended, thus avoiding any sealing problem normally due to mechanical bodies and/or transmissions passing through these pipes.

The invention claimed is:

1. A turbine current generator comprising:
   a hollow bearing cylinder configured to be engaged inside a pipe or a duct for the transit of a fluid;
   a hollow rotating cylinder rotatably and coaxially engaged inside the hollow bearing cylinder and defining a respective transit cylindrical chamber for a fluid, the hollow bearing cylinder and the hollow rotating cylinder defining at least a cylindrical gap;
   one or more magnetic or electromagnetic components operatively engaged to the hollow bearing cylinder and/or to the hollow rotating cylinder to generate at least an electric current during the rotation of the hollow rotating cylinder inside the hollow bearing cylinder;
   at least one impeller arranged in the transit cylindrical chamber of the hollow rotating cylinder according to a position aligned with a longitudinal axis of the hollow rotating cylinder, the impeller being engaged inside the hollow rotating cylinder so as to rotate integrally with the hollow rotating cylinder upon the action of a fluid which runs through the hollow rotating cylinder and acts on each impeller,
   wherein the cylindrical gap is occupied at least partially by a dielectric fluid, the cylindrical gap being hermetically isolated with respect to the transit cylindrical chamber of the hollow rotating cylinder, wherein the cylindrical gap comprises at least one connection channel communicating with the transit cylindrical chamber of the hollow rotating cylinder, at least one pressure compensation device operatively arranged in the connection channel at least to reduce the overall volume of the cylindrical gap as the pressure in the transit cylindrical chamber of the hollow rotating cylinder increases.

2. The turbine current generator according to claim 1, wherein the pressure compensation device of the cylindrical gap keeps the pressure difference between the cylindrical gap and the transit cylindrical chamber of the hollow rotating cylinder substantially constant, between -1 bar and 1 bar.

3. The turbine current generator according to claim 2, wherein the compensation device comprises:
   at least one compensation chamber in fluid communication with the connection channel of the cylindrical gap; and
   at least one compensation piston operatively arranged inside the compensation chamber to vary the overall volume of the cylindrical gap.

4. The turbine current generator according to claim 1, wherein a first magnetic or electromagnetic component is engaged, to an internal surface of the hollow bearing cylinder inside the cylindrical gap and a second magnetic or electromagnetic component is engaged to the hollow rotating cylinder to face towards the cylindrical gap at the first magnetic or electromagnetic component.

5. The turbine current generator according to claim 4, wherein the first magnetic or ferromagnetic component comprises a plurality of windings, with each winding of the plurality of windings having a substantially flat structure.

6. The turbine current generator according to claim 5, wherein each winding of the first magnetic or ferromagnetic component comprises a series of conductive tracks which define a laminar and flexible printed circuit, the conductive tracks of each winding mainly developing parallel to each other and having substantially orthogonal connecting sections.

7. The turbine current generator according to claim 6, wherein the conductive tracks of each winding develop on at least two superimposed planes or layers.

8. The turbine current generator according to claim 6, wherein the conductive tracks of each winding are incorporated in, or supported by, a flexible laminar structure switchable between a flat configuration and a cylindrical or semi-cylindrical configuration.

9. The turbine current generator according to claim 8, wherein the flexible laminar structure supporting the conductive tracks of the windings has a rolled or wrapped configuration with superimposed structural portions.

10. The turbine current generator according to claim 8, wherein the conductive tracks of each winding are grouped on respective structural sectors of the flexible laminar structure each having a substantially rectangular shape, the structural sectors of the flexible laminar structure being arranged side by side along a respective long side.

11. The turbine current generator according to claim 10, wherein each winding develops from one of the sides of the respective structural sector of the flexible laminar structure, each winding extending substantially parallel to the perimeter of the respective structural sector, from the periphery 16*c* towards a central area of the same, in correspondence of which the respective winding develops from a plane or layer to the other one in which the winding develops substantially parallel to the perimeter of the respective structural sector from the central area to the periphery of the same.

12. The turbine current generator according to claim 11, wherein the windings of each structural sector of the flexible laminar structure are electrically connected in series or in parallel by means of corresponding connection bridges.

13. The turbine current generator according to claim 8, wherein the flexible laminar structure comprises at least one electrical connection appendix, substantially flat, along which one or more electrical connection tracks for connecting the windings to at least another component of the electric generator develop.

14. The turbine current generator according to claim 4, wherein the second magnetic or ferromagnetic component comprises a plurality of permanent magnets which are fixed, on an external surface of the hollow rotating cylinder.

15. The turbine current generator according to claim 14, wherein each permanent magnet has a substantially parallelepiped shape, and is housed in a respective seat obtained on the external surface of the hollow rotating cylinder, optionally each permanent magnet being sectioned along longitudinal or axial development of each permanent magnet into a plurality of pieces.

16. The turbine current generator according to claim 1, comprising a plurality of impellers arranged in the transit cylindrical chamber of the hollow rotating cylinder according to positions aligned with a longitudinal axis of the hollow rotating cylinder, the impellers being engaged inside the hollow rotating cylinder configured to rotate integrally with the hollow rotating cylinder upon the action of a fluid which runs through the hollow rotating cylinder and acts on each impeller.

17. The turbine current generator according to claim 1, further comprising a plurality of flow rectifiers arranged in the transit cylindrical chamber of the hollow rotating cylinder, the impellers and the flow rectifiers being interleaved along the longitudinal development of the hollow rotating cylinder.

18. The turbine current generator according to claim 17, further comprising at least one static support shaft developing axially inside the transit cylindrical chamber of the hollow rotating cylinder, the impellers being rotatably engaged on the static support shaft so as to rotate, integrally with the hollow rotating cylinder around the longitudinal axis of the hollow rotating cylinder.

19. The turbine current generator according to claim 18, wherein each flow rectifier is fixed on the static support shaft and each flow rectifier is stationary, together with the static support shaft, with respect to the impellers and to the hollow rotating cylinder.

20. The turbine current generator according to claim 18, wherein the static support shaft is engaged, at ends of the static support shaft, to a first and a second support shank which respectively define the inlet and the outlet of the transit cylindrical chamber of the hollow rotating cylinder.

21. The turbine current generator according to claim 20, further comprising:
a first bearing operatively interposed between the first support shank, the hollow bearing cylinder and the hollow rotating cylinder; and
a second bearing operatively interposed between the second support shank, the hollow bearing cylinder and the hollow rotating cylinder, the bearings ensuring the insulation of the cylindrical gap with respect to the transit cylindrical chamber of the hollow rotating cylinder.

* * * * *